(12) United States Patent
Wu et al.

(10) Patent No.: US 7,748,269 B2
(45) Date of Patent: Jul. 6, 2010

(54) LOW LIQUID LEVEL DETECTING DEVICE AND METHOD

(75) Inventors: Jizhou Wu, Shenzhen (CN); Pengjin Lin, Shenzhen (CN)

(73) Assignee: Shenzhen Mindray Bio-Medical Electronics Co., Ltd. (CN)

( * ) Notice: Subject to any disclaimer, the term of this patent is extended or adjusted under 35 U.S.C. 154(b) by 360 days.

(21) Appl. No.: 11/986,497

(22) Filed: Nov. 20, 2007

(65) Prior Publication Data

US 2008/0168836 A1 Jul. 17, 2008

(30) Foreign Application Priority Data

Jan. 11, 2007 (CN) .................. 2007 1 0072850

(51) Int. Cl.
*G01F 23/00* (2006.01)
(52) U.S. Cl. .............................. 73/313; 73/309; 73/305
(58) Field of Classification Search .................. 73/313, 73/309, 305
See application file for complete search history.

(56) References Cited

U.S. PATENT DOCUMENTS

| | | | |
|---|---|---|---|
| 4,342,224 A * | 8/1982 | Hara et al. ................. | 73/290 R |
| 6,032,529 A | 3/2000 | Saito et al. | |
| 7,188,613 B2 * | 3/2007 | Miura et al. ................. | 123/516 |
| 7,571,740 B2 * | 8/2009 | Kaneko et al. ............... | 137/202 |
| 2006/0213555 A1 * | 9/2006 | Miura et al. ................. | 137/202 |

FOREIGN PATENT DOCUMENTS

| | | |
|---|---|---|
| CN | 2417464 | 1/2001 |
| CN | 2540624 | 3/2003 |
| CN | 1904567 | 1/2007 |
| CN | 1932455 | 3/2007 |
| JP | 9318422 | 12/1997 |
| JP | 2001296169 | 10/2001 |

OTHER PUBLICATIONS

Chinese Search Report dated Aug. 8, 2007 for Chinese Patent Application No. 200710072850.2.
Luo Yu-Feng et al. "High Precision and Continuous Optical Fiber F-P Cavity Liquid Level Sensor" China Academic Journal Electronic Publishing House, Jan. 2006, vol. 33, No. 1, pp. 72-76.

* cited by examiner

*Primary Examiner*—Hezron Williams
*Assistant Examiner*—Rodney T Frank
(74) *Attorney, Agent, or Firm*—Vista IP Law Group, LLP.

(57) ABSTRACT

The invention discloses a low liquid level detecting device comprising a float sensor and a casing. The casing has first to third chambers formed between an upper wall and a bottom wall. The top portion of the first chamber is formed with a top opening. The bottom portion of the first chamber is fluid communicated with the bottom portion of the second chamber. The top portion of the second chamber is fluid communicated with the top portion of the third chamber. The bottom portion of the third chamber is formed with a bottom opening. A float sensor is mounted inside the third chamber. A drain hole is formed through the bottom part of a chamber wall surrounding the third chamber. A method for detecting a low liquid level using the above low liquid level detecting device is also disclosed.

10 Claims, 2 Drawing Sheets

LOW LIQUID LEVEL DETECTING DEVICE AND METHOD

CROSS-REFERENCE TO RELATED APPLICATION(S)

This application claims foreign priority under Title 35, United Stats Code, §119(a)-(d) or §365(b) to Chinese Patent Application No. 200610035553.6, which was filed on May 17, 2006 into the State Intellectual Property Office of the People's Republic of China.

TECHNICAL FIELD

The present invention relates to the field of liquid level detecting, especially to a detecting device and a detecting method for detecting the level of a liquid, such as a consumable liquid material, which should not be or cannot be transferred between different containers.

BACKGROUND ART

In medical and surgical detection equipments, when there is a consumable liquid material that should not be or cannot be transferred between different containers, a liquid level detecting device is usually provided for detecting a certain low level of the liquid. An objective in the design of a detecting device is that the detecting device responds to a small volume or level of remaining or residual liquid, thus the consumption rate of the consumable material can be increased.

In known low liquid level detecting devices, float sensors are generally used for detecting liquid levels. In a float sensor, a float body moves up and down with the liquid surface, thus a magnetic ring enclosed in the float body also moves up and down. When the liquid level in the container is high, the float body is at a high position. On the other hand, when the liquid level in the container falls down to a certain extent, the magnetic ring, falling together with the float body, initiates a magnetic switch by magnetic induction. The magnetic switch sends a signal to a control circuit, which detects out that the liquid level in the container reaches to a low condition.

In such a float sensor, under the limitation of the above magnetic induction principle, the float sensor is generally bulky. Meanwhile, since the weight of the float body is high, the lowest liquid level necessary to cause the lowering float body initiating the magnetic switch is relatively high. In this condition, during detection, when the sensor responds to the float body moving close to the bottom portion of the container, the level of the remaining liquid in the container is still relatively high, which results in that it cannot effectively reflect whether the liquid level really reaches to the bottom portion of the container.

SUMMARY OF INVENTION

An object of the present invention is to overcome the above shortages existed in the prior art by providing a low liquid level detecting device and a corresponding method which are effective at a very low level of the remaining or residual liquid in the container, and thus the consumption rate of the liquid can be increased.

To achieve the above object, the present invention, in one aspect, provides a low liquid level detecting device comprising a float sensor and a casing, wherein the casing has a top wall, a bottom wall and a first chamber, a second chamber and a third chamber formed between the upper and bottom walls and separated from each other, the top portion of the first chamber is formed with a top opening, the bottom portion of the first chamber is fluid communicated with the bottom portion of the second chamber via a first connection passage, the top portion of the second chamber is fluid communicated with the top portion of the third chamber via a second connection passage, the bottom portion of the third chamber is formed with a bottom opening, a float sensor is mounted inside the third chamber, and a drain hole is formed through the bottom part of a chamber wall surrounding the third chamber.

According to an embodiment of the present invention, preferably, the drain hole is formed down to the bottom surface of the casing, and the height of the drain hole is set to be smaller than the distance between the highest point of the first connection passage and the bottom surface of the casing.

According to an embodiment of the present invention, preferably, the height of the drain hole is not larger than the distance between the lowest point of the first connection passage and the bottom surface of the casing.

According to an embodiment of the present invention, preferably, the highest point of the second connection passage is lower than the top surface of the casing.

According to an embodiment of the present invention, preferably, the first chamber, the first connection passage and the second chamber form a substantial "U" shape, and the second chamber, the second connection passage and the third chamber form a substantial inverted "U" shape.

According to an embodiment of the present invention, preferably, wherein the float sensor comprises a guiding bar, a magnetic switch and a float body with a magnetic ring fixed to it, the guiding bar is fixed inside the third chamber and extends in a vertical orientation, the magnetic switch is fastened to a lower part of the guiding bar, and the float body loosely surrounds the guiding bar and is able to move up and down along the guiding bar under the action of the buoyance of the liquid in the third chamber.

The present invention, in another aspect, provides a method for detecting a low liquid level using the low liquid level detecting device of the invention, wherein the low liquid level detecting device is immersed in a liquid to be detected, such that the first chamber, the second chamber, and the third chamber is filled with the liquid; then, as the level of the liquid to be detected falls down and below the top opening of the first chamber, the liquid in the first chamber, the second chamber and the third chamber flows out from the device through the drain hole, thus the liquid surface in the first chamber falls down together with the level of the liquid to be detected, but the liquid surfaces in the second chamber and the third chamber remain unchanged; and when the level of the liquid to be detected falls down to a height lower than the highest point of the first connection passage, the liquid in the second chamber and the third chamber flows quickly out from the device through the drain hole, thus the float sensor detects out the low liquid level.

According to an embodiment of the present invention, preferably, the float sensor comprises a guiding bar, a magnetic switch and a float body with a magnetic ring fixed to it, the guiding bar is fixed inside the third chamber and extends in a vertical orientation, the magnetic switch is fastened to a lower part of the guiding bar, and the float body loosely surrounds the guiding bar and is able to move up and down along the guiding bar under the action of the buoyance of the liquid in the third chamber, and wherein the float body remains at the top position of its vertical stroke until the level of the liquid to be detected falls below the highest point of the first connection passage.

According to an embodiment of the present invention, preferably, after the level of the liquid to be detected falls down to a height lower than the highest point of the first connection passage, as the liquid in the second chamber and the third chamber flows quickly out through the drain hole, the float body falls down rapidly and impacts onto the magnetic switch and thus initiates the magnetic switch, so that the magnetic switch sends out a signal to a control circuit which detects out that the level of the liquid to be detected reaches to low liquid level.

According to an embodiment of the present invention, preferably, when the low liquid level detecting device is immersed in the liquid to be detected, all or most of the air in the first to the third chambers is expelled out.

The present invention can thus obtain advantages over the prior art. Specifically, the casing and the float sensor are integrated in the device and form a vessel in fluid communication with the liquid container, so that the float body of the float sensor responds to a very low liquid level in the container. Thus the problem existed in the prior art, i.e., the float sensor only detects when a large quantity of liquid is still remained in the container due to the size and induction principle of it, can be overcome by the present invention. Meanwhile, by controlling the level of the remaining liquid to be detected by setting the distance from the highest point of the first connection passage to the bottom portion of the container, a significantly lowered level of the remaining liquid to be detected is allowed, thus the consumption rate of the consumable liquid material can be increased.

BRIEF INTRODUCTION TO THE DRAWINGS

The present invention will be described in details with reference to the drawings in which.

DETAILED DESCRIPTION OF THE PREFERRED EMBODIMENTS

Figure 1:
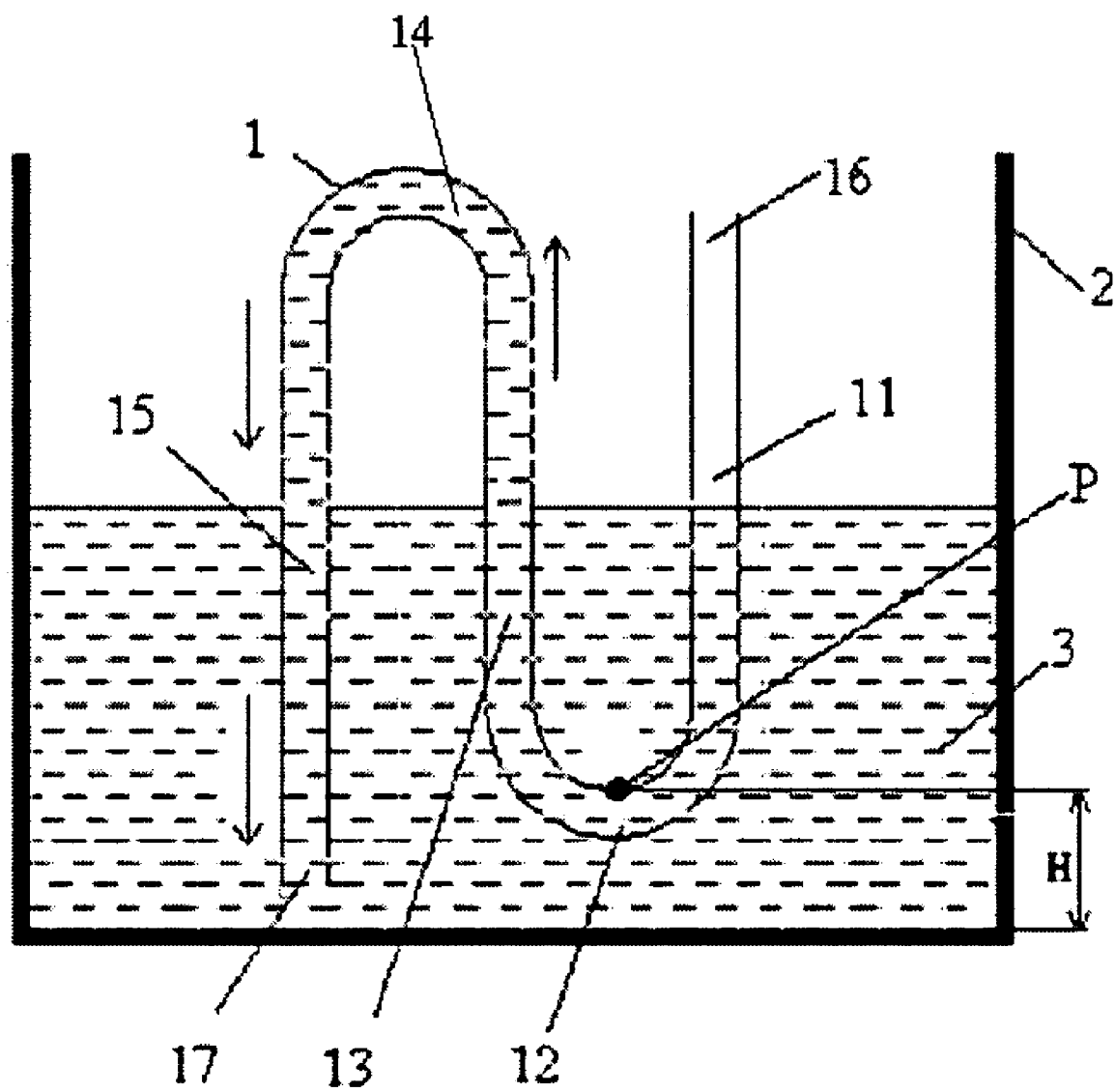
FIG. 1 is a principle diagram of an embodiment of the present invention.

The operation principle of the low liquid level detecting device of an embodiment of the present invention and the corresponding detecting method is schematically shown in FIG. 1. Specifically, a curved pipe 1 is arranged in the container 2. The container 2 is previously or is then filled with a liquid 3. The curved pipe 1 comprises a first straight pipe section 11, an arcuate first connection pipe section 12, a second straight pipe section 13, an arcuate second connection pipe section 14 and a third straight pipe section 15. The upper end of the first straight pipe section 11 has a top opening 16 for communicating with the outside atmosphere, and the lower end of the first straight pipe section 11 is connected with the lower end of the second straight pipe section 13 via the first connection pipe section 12. The upper end of the second straight pipe section 13 is connected with the upper end of the third straight pipe section 15 via the second connection pipe section 14. The lower end of the third straight pipe section 15 has a bottom opening 17 for communicating with the inner volume of the container 2. The first straight pipe section 11, the first connection pipe section 12 and the second straight pipe section 13 form a substantial upright "U" shape, the second straight pipe section 13, the second connection pipe section 14 and the third straight pipe section 15 form a substantial inverted "U" shape. When the curved pipe 1 is arranged in the container and is immersed in the liquid 3, since the top opening 16 at the upper end of the curved pipe (i.e. the opening of the first straight pipe section 11) communicates with the outside atmosphere and the bottom opening 17 at the lower end communicates with the inner volume of the container (i.e., the lower end communicates with the inner volume of the container via the bottom opening of the third straight pipe section), the curved pipe 1 forms a fluid communication vessel with the container 2, whereby the curved pipe is filled with liquid. After the liquid level in the container is reduced to be lower than the top opening 16, the liquid surface in the first straight pipe section 11 will be lowered together with the liquid level in the container under the influence of the atmosphere pressure, while the liquid surfaces in the second straight pipe section 13 and the third straight pipe section 15 remain unchanged without being lowered. Then, when the liquid level in the container is of the same height as or a little lower than the highest point P of the first connection pipe section 12 (i.e. the point in the first connection pipe section which has a maximum vertical distance from the bottom portion of the container), the liquid in the second straight pipe section 13 and the third straight pipe section 15, under the influence of the atmosphere pressure, will loss its equilibrium suddenly, and the liquid in the curved pipe 1 will suddenly flow in a direction shown by the arrows in FIG. 1 and drain out from the bottom opening 17 of the third straight pipe section. Thus, it can identify that the height of the liquid level (surface) of the container is now corresponding to the height H of the highest point P from the bottom portion of the container. In practice, the height H can be set to be very small.

Figure 2:
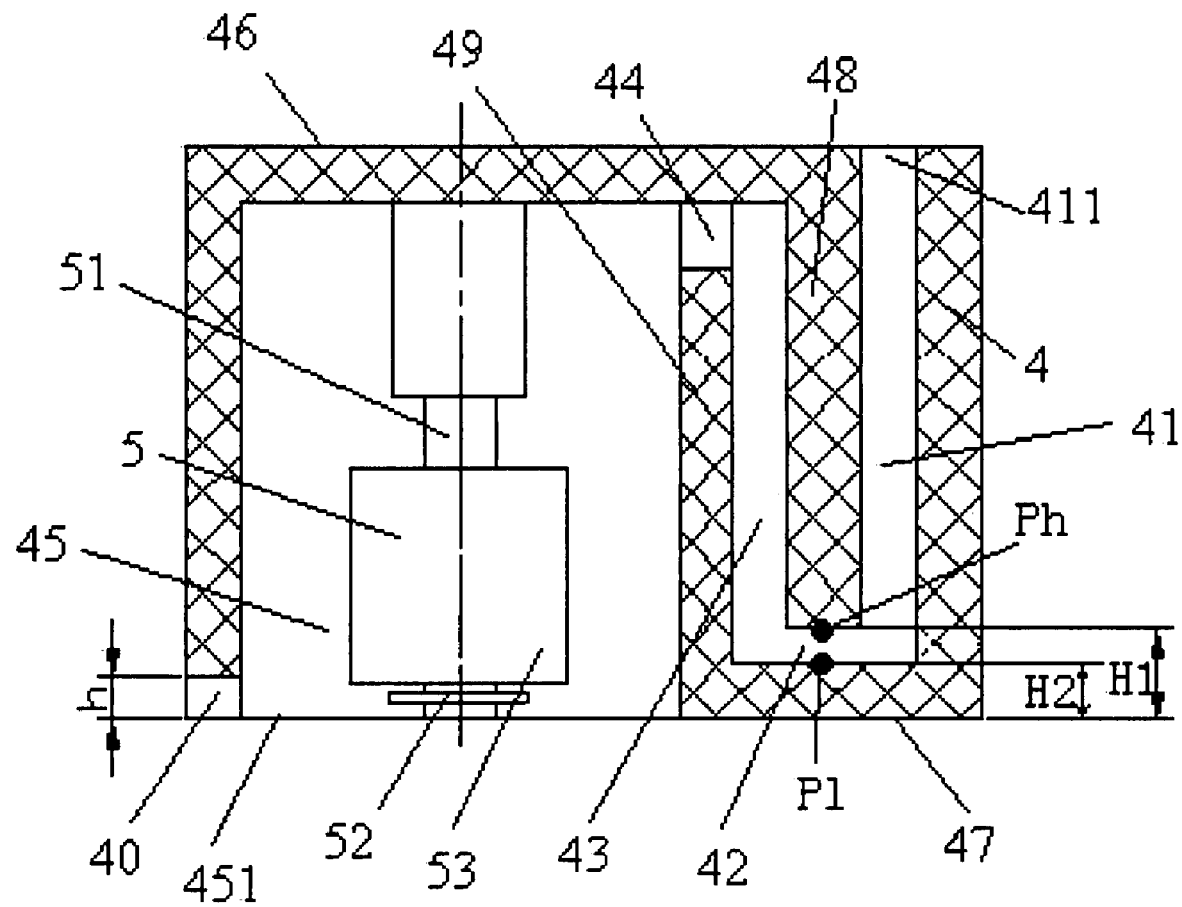
FIG. 2 is a schematic sectional view of the structure of the low liquid level detecting device of the embodiment of the present invention.

Referring to FIG. 2, a low liquid level detecting device according to an embodiment of the present invention comprises a casing 4 and a float sensor 5. The casing 4 has a horizontal top wall 46, a horizontal bottom wall 47, and a first chamber 41, a first connection passage 42, a second chamber 43, a second connection passage 44 and a third chamber 45 formed between the upper and bottom walls 46, 47. A top opening 411 communicating with the outside atmosphere is formed at the top portion of the first chamber 41 (the top opening 411 is opened in the top surface of the casing top wall 46). The bottom portion of the first chamber 41 is communicated with the bottom portion of the second chamber 43 via the horizontal first connection passage 42. The top portion of the second chamber 43 is communicated with the top portion of the third chamber 45 via the horizontal second connection passage 44. A bottom opening 451 is formed in the bottom portion of the third chamber 45 (the bottom opening 451 is opened in the bottom surface of the bottom wall 47 of the casing). The first chamber 41 and the second chamber 43 are separated from each other by a vertical first partition wall 48, and the second chamber 43 and the third chamber 45 are separated from each other by a vertical second partition wall 49. In a vertical section, the first chamber 41, the first connection passage 42 and the second chamber 43 form a substantial "U" shape, while the second chamber 43, the second connection passage 44 and the third chamber 45 form a substantial inverted "U" shape. Further, in the condition that the casing 4 is put on the bottom portion of a container so that bottom wall 47 of the casing is attached to the bottom portion of the container, a drain hole 40 formed through the bottom part of a vertical chamber wall surrounding the chamber 45 allows the liquid flow into or out from the third chamber. The drain hole 40 is cut down through the bottom wall 47 of the casing. The float sensor 5 comprises a guiding bar 51, a magnetic switch 52, and a float body 53 with a magnetic ring fixed to it. The guiding bar 51 is fixed in a vertical orientation in the third chamber 45, and the magnetic switch 52 is fastened to a lower part of the guiding bar 51. The float body 53 loosely surrounds the guiding bar 51 so as to move up and down along the guiding bar 51 under the action of the buoyance of the liquid in the third chamber. The first connection passage, which is a slot through the first partition wall, also creates a clearance between the first partition wall and the bottom portion of the casing, which clearance corresponding to the first connection passage. The second connection passage, which is a slot through the second partition wall, also creates a clearance between the second partition wall and the top portion of the casing, which clearance corresponding to the first connection passage. In this embodiment, the third chamber has both the bottom opening formed in the bottom surface of the bottom wall of the casing and the drain hole extending horizontally through the vertical chamber wall of the chamber. However, it can be understood that the third chamber may only have one of the opening and the drain hole. When only the drain hole is provided, the drain hole functions as the bottom opening for discharging the liquid from the third chamber.

Now a method for detecting a low liquid level using the above described low liquid level detecting device, or the operation procedure of the low liquid level detecting device, will be described. First, the whole device is put onto the bottom portion of a container (i.e., the bottom surface of the casing is attached to the bottom portion of the container). The container is previously or is then filled with a liquid such that the whole device is immersed in the liquid. Since the casing 4 forms a fluid communication vessel with the container, all the chambers 41, 43 and 45 and both the connection passages 42, 44 are filled with liquid. Now, under the action of the buoyance of the liquid, the float body 53 of the float sensor is at the top position of its vertical stroke along the guiding bar 51. With the liquid level in the container gradually falling down, the liquid level in the container becomes lower than the top opening 411 of the device, then the liquid surface in the first chamber 41 falls down together with the liquid level in the container, but the liquid surfaces in the second chamber 43 and the third chamber 45 do not fall down. The float body 53 remains at the top position of the vertical stroke, until the liquid surface in the first chamber 41 (corresponding to the liquid level in the container) reaches down to the highest point Ph of the first connection passage 42 (i.e., the point having the largest vertical distance from the bottom portion of the container, which also having the largest vertical distance from bottom wall 47 of the casing). At this point, or with the liquid level in the container falls further down a little, the liquid in the second chamber 43 and the third chamber 45 quickly flows out through the drain hole 40 at the bottom portion of the third chamber and the second and third chambers are evacuated, it follows that the float body 53 of the float sensor falls rapidly under the action of gravity along the guiding bar 51 to bottom position of the vertical stroke so as to impacts onto the magnetic switch 52 and initiates the magnetic switch 52. The magnetic switch 52 sends out a signal to a control circuit, which judges out that the liquid level in the container reaches to a low liquid level or becomes proximate to the bottom portion of the container. The height of the level of the remaining liquid in the container can thus be controlled by the device by setting the vertical distance H1 between the highest point Ph of the first connection passage 42 and the bottom portion of the container (i.e., the vertical distance H1 between the highest point Ph and the bottom surface of the bottom wall 47 of the casing). In practice, this distance H1 can be set to be very small, thus the quantity of the remaining liquid in the container can be very small. In the device, the height h of the drain hole 40 should be smaller than the distance H1, and preferably the height h of the drain hole 40 is not larger than the vertical distance H2 between the lowest point P1 and the bottom surface of the container, or h≦H2, thus the liquid in both connection passages 42, 44 can be drained out in a largest extent. Furthermore, the highest point of the second connection passage 44 is lower than the top opening 411 of the first chamber 41 (i.e., the highest point of the second connection passage is lower than the top surface of the top wall 46 of the casing), so as to expel all or most of the air from the three chambers 41, 43 and 45 when the device is immersed in the liquid in the container. At this end, it should be noted that, after the device is immersed in the liquid in the container, even if a small amount of air is existed in the upper portions of the third chamber 45 and the second connection passage 44, the device also functions stably.

The present invention is described with reference to its preferred embodiments which are not intended to restrict the scope of the present invention. A skilled in the art will readily recognize that modifications and changes can be made to the embodiments without departing from the spirit of the present invention, and accordingly all these modifications and changes may be regarded as falling within the scope of the present invention.

What is claimed is:

1. A low liquid level detecting device, comprising:
   a float sensor and a casing, wherein the casing has a top wall;
   a bottom wall and a first chamber;
   a second chamber and a third chamber formed between the upper wall and the bottom wall and separated from each other;
   a top portion of the first chamber, wherein the top portion of the first chamber is formed with a top opening, wherein
      a bottom portion of the first chamber is fluid communicated with a bottom portion of the second chamber via a first connection passage,
      a top portion of the second chamber is fluid communicated with a top portion of the third chamber via a second connection passage, and
      a bottom portion of the third chamber is formed with a bottom opening;
   a float sensor, wherein the float sensor is mounted inside the third chamber; and
   a drain hole, wherein the drain hole is formed through a bottom part of a chamber wall surrounding the third chamber.

2. The low liquid level detecting device of claim 1, wherein the drain hole is formed on a bottom surface of the casing, and a height of the drain hole is set to be smaller than a distance between a highest point of the first connection passage and the bottom surface of the casing.

3. The low liquid level detecting device of claim 2, wherein the height of the drain hole is not larger than a distance between a lowest point of the first connection passage and the bottom surface of the casing.

4. The low liquid level detecting device of claim 1, wherein a highest point of the second connection passage is lower than a top surface of the casing.

5. The low liquid level detecting device of claim 1, wherein the first chamber, the first connection passage, and the second chamber form a substantial "U" shape, and the second chamber, the second connection passage, and the third chamber form a substantial inverted "U" shape.

6. The low liquid level detecting device of claim 1, wherein the float sensor comprises a guiding bar, a magnetic switch, and a float body with a magnetic ring fixed to it, the guiding bar is fixed inside the third chamber and extends in a vertical orientation, the magnetic switch is fastened to a lower part of the guiding bar, and the float body loosely surrounds the guiding bar and is able to move up and down along the guiding bar by an action of the buoyance of liquid in the third chamber.

7. A method for detecting a low liquid level, comprising:

using the low liquid level detecting device of claim 1 for detecting the low liquid level, wherein the low liquid level detecting device is immersed in a liquid to be detected such that the first chamber, the second chamber, and the third chamber is filled with the liquid;

as a level of the liquid to be detected falls down and below the top opening of the first chamber, the liquid in the first chamber, the second chamber, and the third chamber flows out from the third chamber through the drain hole and thus causes a liquid level in the first chamber to fall down together with the level of the liquid to be detected while liquid surfaces in the second chamber and the third chamber remain unchanged; and when the level of the liquid to be detected falls down to a height lower than a highest point in the first connection passage, liquid in the second chamber and the third chamber flows quickly out from the third chamber through the drain hole and thus causes the float sensor to detect the low liquid level.

8. The method of claim 7, wherein the float sensor comprises:

a guiding bar, a magnetic switch,. and a float body with a magnetic ring fixed to it, wherein the guiding bar is fixed inside the third chamber and extends in a vertical orientation, the magnetic switch is fastened to a lower part of the guiding bar, the float body loosely surrounds the guiding bar and is able to move up and down along the guiding bar by an action of the buoyance of the liquid in the third chamber, and the float body remains at a top position of its vertical stroke until the level of the liquid to be detected falls below the highest point in the first connection passage.

9. The method of claim 7, wherein after the level of the liquid to be detected falls down to a height lower than the highest point in the first connection passage, the liquid in the second chamber and the third chamber flows quickly out through the drain hole so as to cause the float body to fall down rapidly and impacts upon the magnetic switch and thus initiates the magnetic switch so that the magnetic switch sends out a signal to a control circuit which detects that the level of the liquid to be detected reaches the low liquid level.

10. The method of claim 7, wherein when the low liquid level detecting device is immersed in the liquid to be detected, all or most of air in the first chamber to the third chambers is expelled out.

* * * * *